(12) United States Patent
Chen et al.

(10) Patent No.: US 11,377,579 B2
(45) Date of Patent: Jul. 5, 2022

(54) ALKYL CYCLIC ANHYDRIDE BASED EMULSIFIERS FOR OIL BASED MUD

(71) Applicant: M-I L.L.C., Houston, TX (US)

(72) Inventors: Yiyan Chen, Sugar Land, TX (US); Dimitri M. Khramov, Katy, TX (US); Reda Karoum, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/469,620

(22) PCT Filed: Dec. 18, 2017

(86) PCT No.: PCT/US2017/066903
§ 371 (c)(1),
(2) Date: Jun. 13, 2019

(87) PCT Pub. No.: WO2018/112450
PCT Pub. Date: Jun. 21, 2018

(65) Prior Publication Data
US 2020/0079990 A1  Mar. 12, 2020

Related U.S. Application Data

(60) Provisional application No. 62/435,372, filed on Dec. 16, 2016.

(51) Int. Cl.
*C09K 8/32* (2006.01)

(52) U.S. Cl.
CPC .................................. *C09K 8/32* (2013.01)

(58) Field of Classification Search
None
See application file for complete search history.

(56) References Cited

U.S. PATENT DOCUMENTS 7,825,071 B2    11/2010  Ballard
2006/0144595 A1*  7/2006  Milligan ................ E21B 41/02
                                                    166/305.1

(Continued)

OTHER PUBLICATIONS

International Preliminary Report on Patentability for the equivalent International patent application PCT/US2017/066903 dated Jun. 27, 2019.

(Continued)

*Primary Examiner* — Jeffrey D Washville
(74) *Attorney, Agent, or Firm* — Garry Brown, Jr.

(57) ABSTRACT

Wellbore fluids may include an oleaginous continuous phase; a non-oleaginous discontinuous phase; and an emulsifier stabilizing the non-oleaginous discontinuous phase in the oleaginous continuous phase, wherein the emulsifier is the product of a reaction between an alkyl cyclic anhydride and a polar reactant, wherein the polar reactant is one or more selected from a group containing alkyl amine, alkanolamine, and polyamine. Methods may include drilling a wellbore with an oil-based mud, wherein the oil-based mud is an invert emulsion containing an emulsifier stabilizing the invert emulsion, wherein the emulsifier is the product of a reaction between an alkyl cyclic anhydride and a polar reactant, wherein the polar reactant is one or more selected from the group of alkyl amine, alkanolamine, and polyamine.

10 Claims, 2 Drawing Sheets

(56) References Cited

U.S. PATENT DOCUMENTS

| | | | |
|---|---|---|---|
| 2007/0293401 A1* | 12/2007 | Ballard | C09K 8/36 507/129 |
| 2012/0061083 A1 | 3/2012 | Ballard | |
| 2016/0002521 A1 | 1/2016 | Dillon et al. | |
| 2016/0304763 A1 | 10/2016 | Zha | |
| 2016/0355629 A1 | 12/2016 | Deshpande et al. | |

OTHER PUBLICATIONS

Martin, et al., "The Existence of Imidazoline Corrosion Inhibitors," Corrosion, 1985, vol. 41, No. 5, pp. 281-287.

Reynolds, et al., "Structure of High Internal Phase Aqueous-in-Oil Emulsions and Related Inverse Micelle Solutions. 3. Variation of Surfactant," Journal of Physical Chemistry B, 2009, 113 (36), pp. 12231-12242.

Watts, "Imidazoline Hydrolysis in Alkaline and Acidic Media—A Review" Journal of the American Oil Chemists' Society 1990, vol. 67, No. 12, pp. 993-995.

International Search Report and Written Opinion for the equivalent International patent application PCT/US2017/066903 dated Jun. 12, 2018.

* cited by examiner

ALKYL CYCLIC ANHYDRIDE BASED EMULSIFIERS FOR OIL BASED MUD

This application claims the benefit of and priority to a US Provisional Application having Ser. No. 62/435,372, filed 16 Dec. 2016, which is incorporated by reference herein.

BACKGROUND

During wellbore operations, various fluids may be used in the well for a variety of functions. The fluids may be circulated through a bore hole, which may subsequently flow upward through the wellbore to the surface. During this circulation, the drilling fluid may remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Wellbore fluids may take the form of oil-based fluids such as invert emulsion muds. The components of the invert emulsion fluids include an oleaginous liquid such as hydrocarbon oil which serves as a continuous phase, a non-oleaginous liquid such as water or brine solution which serves as a discontinuous phase, and an emulsifying agent. Emulsifying agents may be used to lower the interfacial tension of the liquids so that the non-oleaginous liquid may form a stable dispersion of fine droplets in the oleaginous liquid. Additionally, such invert emulsion fluids may contain one or more weighting agents, surfactants, viscosifiers, fluid loss control agents or bridging agents.

SUMMARY

This summary is provided to introduce a selection of concepts that are described further below in the detailed description. This summary is not intended to identify key or essential features of the claimed subject matter, nor is it intended to be used as an aid in limiting the scope of the claimed subject matter.

In one aspect, embodiments of the present disclosure are directed to wellbore fluids that may include an oleaginous continuous phase; a non-oleaginous discontinuous phase; and an emulsifier stabilizing the non-oleaginous discontinuous phase in the oleaginous continuous phase, wherein the emulsifier is the product of a reaction between an alkyl cyclic anhydride and a polar reactant, wherein the polar reactant is one or more selected from a group containing alkyl amine, alkanolamine, and polyamine.

In another aspect, embodiments of the present disclosure are directed to methods may include drilling a wellbore with an oil-based mud, wherein the oil-based mud is an invert emulsion containing an emulsifier stabilizing the invert emulsion, wherein the emulsifier is the product of a reaction between an alkyl cyclic anhydride and a polar reactant, wherein the polar reactant is one or more selected from the group of alkyl amine, alkanolamine, and polyamine.

Other aspects and advantages of the disclosure will be apparent from the following description and the appended claims.

DETAILED DESCRIPTION

This disclosure relates generally to emulsifier compositions used to stabilize invert emulsions. In one or more embodiments, emulsifiers in accordance with the present disclosure may include alkyl cyclic anhydride based emulsifiers. In some embodiments, emulsifiers may promote invert emulsion stability at high-pressure high-temperature (HPHT) conditions such as those encountered within a wellbore.

Emulsifiers used in wellbore applications to stabilize emulsions may undergo degradation in extreme conditions, leading to fluid instability, sagging, and phase separation. For example, emulsifiers used in OBM may be susceptible to hydrolytic degradation because the aqueous phases may contain substantial amount of caustic materials such as lime and elevated pHs that can initiate hydrolysis of labile bonds in the emulsifier, particularly at elevated temperatures.

In one or more embodiments, alkyl cyclic anhydride-based emulsifiers may be used as emulsifiers for formulating oil-based muds. Further, emulsifiers in accordance with the present disclosure may have favorable impacts on wellbore fluid rheology, including improving pumpability and preventing particulate sag and shale dispersion. Alkyl cyclic anhydride-based emulsifiers may also be prepared from synthetic polymers, which may be tuned to control molecular weight and degree of branching, allowing a greater degree of flexibility over conventional fatty acid-based surfactants derived from natural compounds. The synthetic nature of the polymeric constituents of the emulsifier also makes it possible to control polymerization and tune the hydrophilic/lipophilic balance (HLB) ratio of the emulsifiers.

Alkyl cyclic anhydride-based emulsifiers in accordance with the present disclosure may include branched structures that occupy larger footprints on the surface of emulsion micelles than fatty acid emulsifiers, and further may have a decreased tendency to crystallize out of solution or develop unreasonably high or low temperature rheology in various base oils. In some embodiments the linkage between the hydrophobic tail and the cyclic anhydride may also be a non-polar C—C bond in order to provide additional stability.

Alkyl Cyclic Anhydride

In one or more embodiments, alkyl cyclic anhydride based emulsifiers may be prepared from the reaction of an alkyl cyclic anhydride and an alkanolamine or polyamine. In some embodiments, alkyl cyclic anhydrides may be prepared from oligomers and polymers of small-molecule unsaturated compounds such as ethylene, propene, butylene, or isobutylene that have been modified to contain a cyclic anhydride functionality. The oligomers and polymers may then be functionalized with an unsaturated cyclic anhydride to generate a cyclic anhydride moiety such as succinic anhydride, glutaric anhydride, tetrahydrophthalic anhydride, hexahydrophthalic anhydride, phthalic anhydride, norbornene-2,3-dicarboxylic anhydride, and naphthalenic dicarboxylic anhydride. By way of example, alkyl cyclic anhydrides may include polyisobutylene succinic anhydride (PIBSA) prepared from the reaction of polyisobutylene and maleic anhydride.

In some embodiments, alkyl cyclic anhydrides in accordance with the present disclosure may be of the general formula:

wherein R1 is an alkyl chain having a carbon number of 20 to 300 that is branched or linear; m is an integer selected from 0 to 4; and n is an integer selected from the range of 0 to 4, wherein the sum of m and n is 1 or greater.

In some embodiments, the weight average molecular weight of the constituent alkyl chain of the alky cyclic anhydride may range from 250 Da to 10 kDa, 250 Da to 5 kDa, or from 250 Da to 1.2 kDa. In some embodiments, the alkyl chain of the alkyl cyclic anhydride may be a polyisobutylene having 5 to 20 isobutylene repeats. Thus, in one or more embodiments, the emulsifier has at least one polyisobutylene tail (having, for example, 5 to 20 isobutylene repeats) bonded to a polar functionality, which may be, for example, at least one amide.

Polar Reactant

In one or more embodiments, alkyl cyclic anhydride based emulsifiers may be derived from the reaction of an alkyl cyclic anhydride and a polar reactant such as an alkyl amine, alkanolamine, or polyamine to form a covalent linkage such as an amide or imide. In one or more embodiments, polar reactants in accordance with the present disclosure may include C1 to C10 alkyl amines, such as methyl amine, ethyl amine, and the like. Alkyl amines may be substituted or non-substituted, branched or unbranched, saturated and unsaturated. In some embodiments, alkyl amines may include aryl groups or other aromatic structures such as benzyl, phenyl, phenolic, and the like.

In some embodiments, alkanolamines in accordance with the present disclosure may include ethanolamine, diethylethanolamine, diethanolamine, triethanolamine, methyl ethanolamine, ethyl ethanolamine, propylethanolamine, methyl diethanolamine, ethyl diethanolamine, dimethylethanolamine, diethyl ethanolamine, and the like. In one or more embodiments, alkanolamines include polyetheramines, amine functionalized oligomers and polymers of ethylene oxide and propylene oxide, polyesteramines, polysilaneamines, polysiloxaneamines, polyalkylamines such as polybutadieneamine, and the like.

Polar reactants in accordance with the present disclosure may also include polyamines such as ethylene diamine, diethylene triamine, triethylene tetramine, tetraethylene pentamine, 1,4-aminobutane, 1,3-diaminobutane, hexamethylene diamine, 3 (n-isopropyl-amino)propylamine, N,N'-diethyl-1,3-propanediamine, hexapropylene heptamine, penta (1-methyl propylene) hexamine, tetrabutylenepentamine, hexa-(1,1 dimethylethylene) heptamine, di(1-methylbutylene)triamine, pentaamylhexamine, and the like. Polyamines may also be cyclic polyamines, including six-member rings such as piperidine, piperizine, or higher order rings such as seven-member, eight-member, and the like. Cyclic polyamines may also incorporate one or more heteroatoms such as oxygen or sulfur, including cyclic polyamines such as morpholine, thiomorpholine, and the like.

In one or more embodiments, polar reactants may be reacted with an alkyl cyclic anhydride to generate an emulsifier having the general formulae (I)-(VI), where n=5-300, R1 is the same or different from R2 and can be C1 to C18 alkyl, R3 can be hydrogen or a C1-C18 alkyl or acyl chain, and R4 and R5 are independently selected from carboxylic acid, carboxylate, and an amide produced from a polyamine or an alkanolamine. Further, it is understood that in the general formula (I)-(VI), there are other variations that may exist depending on the selected polyamine and/or alkanolamine that is reacted. For example, in place of the ethylene unit(s) in formulae (I)-(IV) and (VI), there may be a propylene or other alkylene unit.

(I)

(II)

(III)

(IV)

(V)

-continued (VI)

As clear from the above examples, the reaction between the anhydride and the polar reactant may result in polar functionality for the emulsifier, considered, for example, as the polar head of the molecule. It is envisioned that polar reactant may react in one or more than one location during the ring opening of the cyclic anhydride, depending on the ratio of polar reactant to cyclic anhydride. Thus, in some embodiments, the emulsifier may be a diamide due to dual reaction with the cyclic anhydride, such as in structure (III), (IV), and (VI). However, it is also envisioned that the emulsifier may be a diamide due to use of a polar reactant having multiple reactive amines (that may react with two anhydrides) such as in Structure (II), or may be a di- (or tri-) amide based on presence of amides groups on the amine, such as in structure (I).

Emulsifiers in accordance with the present disclosure may be added to a wellbore fluid formulation at a percent by weight (wt %) that may range from 0.5 wt % to 15 wt % of the wellbore fluid in some embodiments, and from, and from 1 wt % to 10 wt % in particular embodiments. However, more or less emulsifier may be added depending on the expected conditions downhole and the composition and amount of the oleaginous and aqueous phases in the wellbore fluid.

Base Fluid

Wellbore fluids in accordance with the present disclosure may be prepared as an emulsion having a discontinuous aqueous phase within a continuous oleaginous phase. Base fluids useful for preparing emulsions in accordance with the present disclosure may include at least one of fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts.

Suitable oleaginous or oil-based fluids that may be used to formulate emulsions may include a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

In one or more embodiments The oil:water ratio of an invert emulsion formulation may fall within the range of 40:60 to 95:5.

Wellbore Fluid Additives

The wellbore fluids of the present disclosure may also contain wellbore fluid additives such as emulsifiers, wetting agents, organophilic clays, viscosifiers, bridging agents, fluid loss control agents, alkalinity control agents, and corrosion inhibitors, which may be added to the compositions disclosed herein so as to impart additional functional properties.

Wetting agents that may be suitable for use include, but are not limited to, crude tall oil, oxidized crude tall oil, surfactants, organic phosphate esters, ether carboxylic acids, fatty amines, amidoamines, modified imidazolines and amidoamines, fatty acid amidoamines (including dry fatty acid amidoamines) and salts thereof, ethoxylates, branched or linear primary alcohol ethoxylates, secondary alcohol ethoxylates, branched decyltridecyl alcohol ethoxylates, branched or linear alkylphenol ethoxylates, branched or linear alkyl amine ethoxylates, alkyl ether amine ethoxylates, linear alcohol alkoxylates, alkyl aromatic sulfates and sulfonates such as alkyl benzene sulfonates, calcium dodecylbenzenesulphonate, and the like, and combinations or derivatives of these. VERSAWET™ and VERSA-COAT™, NOVAMUL™, FAZEMUL™, FAZEWET™, MEGAMUL™, SUREMUL™, ONEMUL™, ACTIMUL RD™, and MUL-XT™ are non-limiting examples of commercially available wetting agents manufactured and distributed by M-I, L.L.C. that may be used in the fluids and methods of this disclosure. Other suitable surfactants that are commercially available include SILWET™ series of emulsifiers such as L-77, L-7001, L7605 and L-7622, which are distributed by Union Carbide Chemical Company Inc.

In some embodiments, the wetting agents may be carboxylic acid-based wetting agents such as, for example, dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, wetting agents may be selected from the dimerization products of unsaturated dicarboxylic fatty acids, for example, such as products prepared by dimerization of unsaturated fatty acids containing from 8 to about 18 carbon atoms, including 9-dodecenoic, 9-tetradecenoic, 9-octadecenoic, octadecatetranoic acids, and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Clays such as attapulgite, sepiolite, bentonite, and the like may also be used as viscosifiers. The amount of viscosifier used in the compositions may vary depending on downhole conditions, as understood by those skilled in the art. However, normally about 0.1% to 6% by weight range may be sufficient for most applications. VG-69™, VG-SUPREME™, VG-HT™, and VG-PLUS™ are organoclay available from M-I, L.L.C. (Houston, Tex.), and VERSA-HRP™ is a polyamide resin material available from M-I L.L.C. (Houston, Tex.) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSALIG™, ECOTROL™ family of products, ONETROL-HT™, EMI 789, and NOVATECH™ F, which are all commercially available from MI SWACO (Houston, Tex.).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. Weighting agents in accordance with the present disclosure may include commercially available additives such as M-I WATE™ available from M-I L.L.C. (Houston, Tex.). In other embodiments, the weighting agent may be a micronized weighting agent, optionally coated with a dispersant.

In embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used including polyacrylate esters such as polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

The method used in preparing wellbore fluids described herein is not critical. Conventional methods can be used to prepare the wellbore fluids in a manner analogous to those normally used, to prepare conventional oil-based drilling fluids. In one representative procedure, a desired quantity of oleaginous fluid such as a base oil and a suitable amount of carbon black materials are mixed together and the remaining components (if necessary) are added sequentially with continuous mixing. An invert emulsion of the present disclosure is formed by vigorously agitating, mixing or shearing the oleaginous fluid and the non-oleaginous fluid.

EXAMPLES

In the following examples, invert emulsion wellbore compositions were formulated using varying types of alkyl cyclic anhydride based emulsifiers and assayed for stability under simulated downhole conditions.

Example 1

In the first example, a selection of alkyl cyclic anhydride emulsifiers were assayed including E1, a branched alkyl amide derivative of PIBSA; E2, a polyamine derivative of PIBSA; E3, a polyester copolymer derivative of PIBSA EMI 2034L; and comparative emulsifier C1, a 1 kDa PIBSA. The samples were formulated as 13 ppg invert emulsions at 75:25 oil:water ratio as shown in Table 1, where SYNTHETIC B is a synthetic oil, VG PLUS™ is an organophilic clay, SUREWET™ is wetting agent, ECOTROL L™ is a fluid loss control additive, EMI-3247 is a rheology modifier, M-I WATE' is a weighting agent, and OCMA is a clay additive.

TABLE 1

Sample formulations for example 1.

| | Sample | | | |
|---|---|---|---|---|
| | 1 | 2 | 3 | 4 |
| SYNTHETIC B | 157 | 157 | 157 | 157 |
| VG PLUS ™ | 1.75 | 1.75 | 1.75 | 1.75 |
| lime, g | 5 | 5 | 5 | 5 |
| E1 | 4 | — | — | — |
| E2 | — | 8 | — | — |
| E3 | — | — | 8 | — |
| C1 | — | — | — | 8 |
| SUREWET ™ | 1 | 1 | 1 | 1 |
| RHEFLAT Plus ™ | 0 | 1 | 1 | 1 |
| ECOTROL L ™, g | 3 | 3 | 3 | 3 |
| 25% CaCl$_2$ Brine, g | 89 | 89 | 89 | 89 |
| M-I WATE ™, g | 284 | 284 | 284 | 284 |
| EMI - 3247 | 1.25 | 1.25 | 1.25 | 1.25 |
| OCMA, g | 35 | 35 | 35 | 35 |

Following formulation, the rheology for each of the fluid compositions was measured, initially at 150° F. (samples denoted "B") and again after 16 hours of hot rolling at 250° F. (samples denoted "AHR"). Sample formulations 2-4 exhibited solids settling after 20 minutes at room temperature following hot roll, and further rheological measurements were not performed. Results are tabulated in Table 2.

TABLE 2

Rheology data for Sample compositions 1-4.

| | Sample 1 | | | Sample 2 | | Sample 3 | Sample 4 |
|---|---|---|---|---|---|---|---|
| Hot Roll | B | AHR | | B | | B | B |
| Temp. | 150 F. | 40 F. | 150 F. | 150 F. | 150 F. | 150 F. | 150 F. |
| 600 | 47 | 147 | 45 | 37 | 41 | 45 | 58 |
| 300 | 24 | 79 | 22 | 19 | 18 | 22 | 27 |
| 200 | 16 | 53 | 15 | 12 | 11 | 15 | 17 |
| 100 | 9 | 22 | 8 | 6 | 7 | 8 | 8 |
| 6 | 2 | 3 | 1 | 1 | 2 | 1 | 1 |
| 3 | 2 | 2 | 1 | 0 | 1 | 1 | 1 |
| PV | 23 | 68 | 23 | 18 | 23 | 23 | 31 |
| YP | 1 | 11 | -1 | 1 | -5 | -1 | -4 |
| 10" Gels | 2 | 2 | 1 | 1 | 1 | 1 | 1 |
| 10' Gels | 4 | 3 | 2 | 2 | 1 | 2 | 1 |
| ES | 98 | — | — | 139 | 70 | — | 89 |
| HTHP at 250° F. | — | — | — | 25.4 | — | — | — |
| Water | — | — | — | 1 | — | — | — |

Example 2

In the next example, the temperature stability of E1 was compared to a fluid formulation containing a hydrolysable polyester emulsifier E3. Wellbore compositions were formulated as shown in Table 3 and aged at 350° F. for 16 hours. In the formulations, and VG-HT is an organoclay.

TABLE 3

Wellbore fluid formulations for Example 2.

| | Sample | |
|---|---|---|
| | 5 | 6 |
| SYNTHETIC B | 152 | 152 |
| VG-HT ™ | 2 | 2 |
| lime, g | 5 | 5 |
| rheology modifier | 1 | 1 |
| E3, g | 9 | — |
| E1, g | — | 9 |
| SUREWET ™, g | 2 | 2 |
| ECOTROL HT ™, g | 3 | 3 |
| 25% $CaCl_2$ Brine, g | 65 | 65 |
| M-I WATE ™, g | 410 | 410 |
| Wt | 649.00 | 649.00 |
| Vol | 362.60 | 362.60 |
| Mud Wt, ppg | 14.91 | 14.91 |
| SYNTHETIC B ratio | 80.0% | 80.0% |

Following formulation, the rheology for each of the fluid compositions was measured, initially at 150° F. (samples denoted "B") and again after 16 hours of hot rolling (samples denoted "AHR"). Comparative formulation 5 exhibited flocculation of solids following hot roll, which may be due to decomposition of the ester portion of the emulsifier. Results are tabulated in Table 4.

TABLE 4

Rheology for samples 5 and 6.

| | Sample | | | | |
|---|---|---|---|---|---|
| | 5 | 6 | | | |
| Hot Roll | B | B | | AHR | |
| Temp. | 150 F. | 150 F. | 40 F. | 100 F. | 150 F. |
| 600 | 44 | 53 | 240 | 129 | 90 |
| 300 | 23 | 29 | 137 | 72 | 51 |
| 200 | 15 | 20 | 99 | 50 | 36 |
| 100 | 7 | 11 | 55 | 29 | 21 |
| 6 | 1 | 3 | 6 | 6 | 6 |
| 3 | 1 | 1 | 4 | 5 | 6 |
| PV | 21 | 24 | 103 | 57 | 39 |
| YP | 2 | 5 | 34 | 15 | 12 |
| 10" Gels | 1 | 4 | 7 | 7 | 8 |
| 10' Gels | 1 | 4 | 15 | 15 | 15 |
| ES | 281 | 400 | — | — | 530 |
| HTHP at 350° F. | — | — | — | — | 6 |
| Water | — | — | — | — | 0 |

Example 3

Figure 1:
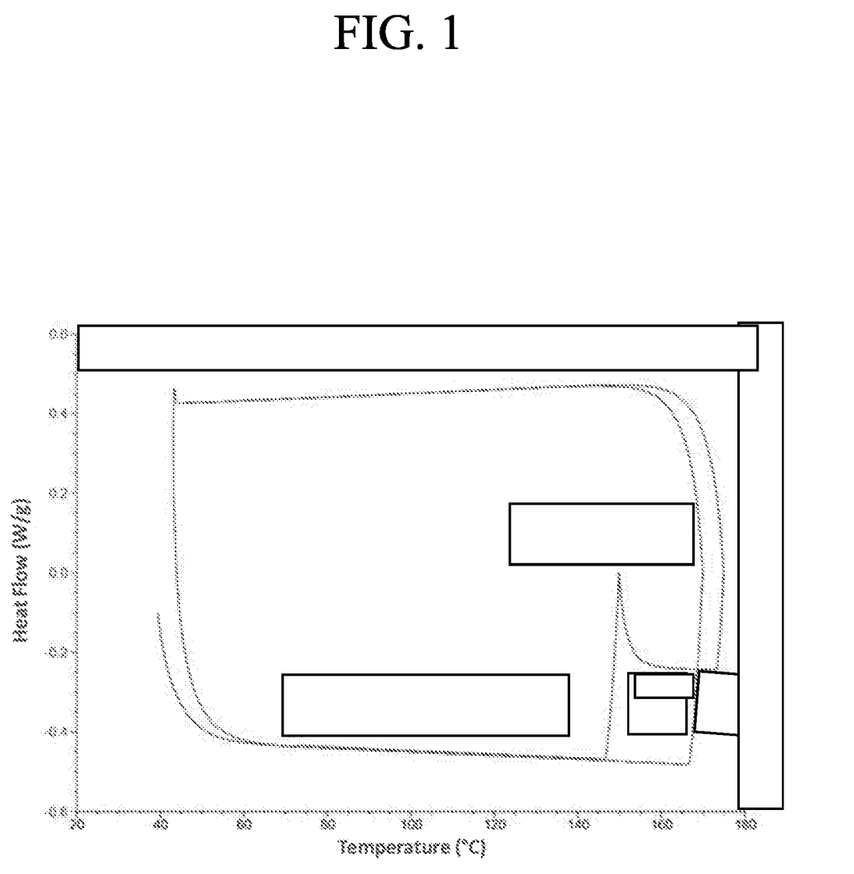
FIGS. 1 and 2 are differential scanning calorimetry (DSC) curves for emulsifier samples in accordance with embodiments of the present disclosure.

In the next example, emulsifiers were tested for stability using an emulsion analysis by differential scanning calorimetry (DSC). With particular respect to FIG. 1, a DSC curve is shown for a selected emulsifier E1 in combination with brine, lime, and Synthetic B base oil. The sample is subjected to the DSC test process of two heating/cooling cycles, the first heating trace also included a holding at 150° C. for the chemical to decompose completely if there is any decomposition then continued heating to 175° C. The first and 2nd heat flow cycles show a match in the heating process up to 150° C. (then programming diverged intentionally), which suggests that no change or hydrolysis occurred during the heating cycle. After emulsion was heated to 175° C., trace from second heat cycle overlays with the first heat cycle ~60-150° C. meaning there is no chemical decomposition occurring in the system.

Figure 2:
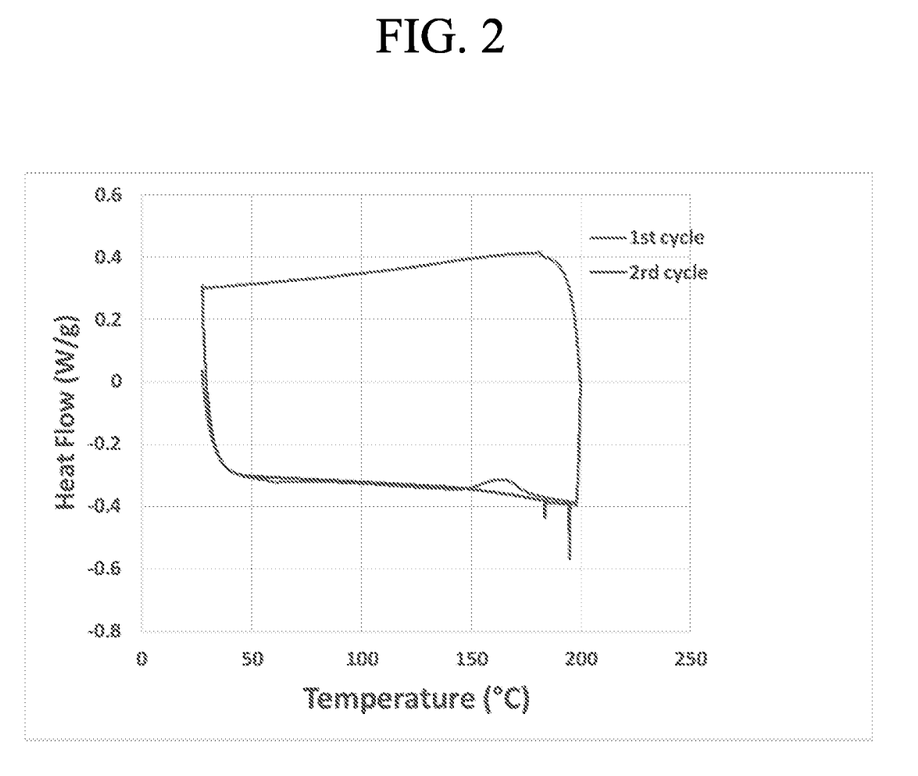

This result is compared to hydrolysable polyester emulsifier E3 as shown in FIG. 2. With particular respect to FIG. 2, a DSC curve of E3 emulsifier in combination with brine, lime, and Synthetic B base oil, and tested according to the same conditions as shown above for E1. The DSC curve shows an exothermic event at ~150° C. that is present the first time the sample was heated but not the second. This could be an indication of decomposition from the hydrolysis of species such as anhydrides and esters.

Example 4

In the next example, E1 alongside comparative emulsifier C1 in order to study the rheological properties of the wellbore fluid following hot roll at 250° F. Wellbore fluid formulations are shown in Table 5.

TABLE 5

Wellbore fluid formulations for Example 4.

| | Samples | |
|---|---|---|
| | 7 | 8 |
| Synthetic B | 157 | 157 |
| VG Plus ™ | 1.75 | 1.75 |
| lime, g | 5 | 5 |
| E1 | 4 | — |
| C1 | — | 8 |
| SUREWET ™ | 1 | 1 |
| RHEFLAT PLUS ™ | 0 | 1 |
| ECOTROL L ™, g | 3 | 3 |
| 25% $CaCl_2$ Brine, g | 89 | 89 |
| M-I WATE ™, g | 284 | 284 |
| EMI-3247 | 1.25 | 1.25 |
| OCMA, g | 35 | 35 |
| Wt | 581.00 | 586.00 |
| Vol | 366.96 | 371.26 |
| Mud Wt, ppg | 13.19 | 13.15 |
| Synthetic B ratio | 75.1% | 75.1% |

Following formulation, the rheology for each of the fluid compositions was measured, initially at 150° F. (samples denoted "B") and again after 16 hours of hot rolling (samples denoted "AHR"). Comparative formulation 8 separated after 20 minutes at room temperature following hot roll at 250° F., which may be due to decomposition of the ester portion of the emulsifier. Further, the formulation containing E1 exhibited increased low shear rate viscosity, suspension properties, and improved response when combined with a rheology modifier. Results are tabulated in Table 6.

TABLE 6

Rheology data for Samples 7 and 8.

| | Sample | | | | | | | |
|---|---|---|---|---|---|---|---|---|
| | 7 | | | | 8 | | | |
| | 150 F. | 40 F. | 100 F. | 150 F. | 150 F. | 40 F. | 100 F. | 150 F. |
| 600 | 47 | 147 | 58 | 37 | 58 | Not Tested. Severe Sag. | | |
| 300 | 24 | 79 | 29 | 19 | 27 | Almost complete solids | | |
| 200 | 16 | 53 | 19 | 12 | 17 | separation after 20 | | |
| 100 | 9 | 22 | 9 | 6 | 8 | minutes on bench at RT | | |
| 6 | 2 | 3 | 2 | 1 | 1 | | | |
| 3 | 2 | 2 | 2 | 0 | 1 | | | |
| PV | 23 | 68 | 29 | 18 | 31 | — | — | — |
| YP | 1 | 11 | 0 | 1 | −4 | — | — | — |
| 10" Gels | 2 | 2 | 1 | 1 | 1 | — | — | — |
| 10' Gels | 4 | 3 | 2 | 2 | 1 | — | — | — |
| ES | 98 | — | — | 139 | 89 | — | — | — |
| HTHP at 250° F. | — | — | — | 25.4 | — | — | — | — |
| Water | — | — | — | 1.0 | — | — | — | — |

In Example 5, the conditions of the experiment is pushed to higher temperature, The sample was hot rolled at 375° F. Sample 9 was formulated as shown in Table 7.

TABLE 7

Wellbore fluid formulations for Example 5.

| | Sample 9 |
|---|---|
| SYNTHETIC B | 152 |
| VG-HT ™ | 3 |
| lime, g | 5 |
| rheology modifier, g | 3 |
| E1, g | 9 |
| C1, g | — |
| SUREWET ™, g | 2 |
| ECOTROL HT ™, g | 2 |
| 25% CaCl₂ Brine, g | 65 |
| M-I WATE ™, g | 410 |
| Wt | 651.00 |
| Vol | 364.49 |
| Mud Wt, ppg | 14.88 |
| Synthetic B ratio | 80.0% |

Following formulation, the rheology for each of the fluid compositions was measured, initially at 150° F. (samples denoted "B") and again after 16 hours of hot rolling (samples denoted "AHR"). The HTHP fluid loss test were done both at 350 and 375 deg F. Results are tabulated in Table 8. As can be seen from these results, the mud survived the 375 deg F. aging and give ok HTHP performance at 375 deg F., showing the stability of the system. It is understood that the fluid loss can be further reduced through the fluid loss additive formulations.

TABLE 8

Rheology data for Samples 9

| Hot Roll | B | AHR | | |
|---|---|---|---|---|
| Temp | 150° F. | 40° F. | 100° F. | 150° F. |
| 600 | 57 | 213 | 95 | 63 |
| 300 | 31 | 113 | 50 | 34 |
| 200 | 20 | 77 | 34 | 23 |
| 100 | 12 | 40 | 19 | 13 |
| 6 | 3 | 5 | 3 | 3 |
| 3 | 2 | 3 | 3 | 2 |
| PV | 26 | 100 | 45 | 29 |
| YP | 5 | 13 | 5 | 5 |
| 10" Gels | 3 | 5 | 6 | 5 |
| 10' Gels | 5 | 17 | 20 | 10 |
| ES | 300 | — | — | 180 |
| HTHP at 350° F. | — | — | — | 4.2 |
| Water | — | — | — | 0 |
| HTHP at 375° F. | — | — | — | 12 |
| Water | — | — | — | 0.4 |

Although the preceding description i described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:
1. A wellbore fluid, comprising:
an oleaginous continuous phase;
a non-oleaginous discontinuous phase; and
an emulsifier stabilizing the non-oleaginous discontinuous phase in the oleaginous continuous phase, wherein the emulsifier is the product of a reaction between an alkyl cyclic anhydride and a polar reactant, wherein the polar reactant is one or more selected from a group consisting of alkyl amine and polyamine;
wherein the polar reactant is one or more polyamines selected from a group consisting of ethylene diamine, diethylene triamine, triethylene tetramine, tetraethylene pentamine, 1,4-aminobutane, 1,3-diaminobutane, hexamethylene diamine, 3 (n-isopropyl-amino)propyl amine, N,N'-diethyl-1,3-propanediamine, hexapropylene heptamine, penta(1-methyl propylene) hexamine, tetrabutylenepentamine, hexa-(1,1-dimethylethylene) heptamine, di(1-methylbutylene)triamine, pentaamylhexamine, piperidine, piperizine, morpholine, and thiomorpholine.

2. The emulsion of claim 1, wherein the alkyl cyclic anhydride is of the formula:

wherein R1 is an alkyl chain having a carbon number of 20 to 300 that is branched or linear; m is an integer selected from 0 to 4; and n is an integer selected from the range of 0 to 4, wherein the sum of m and n is 1 or greater.

3. The wellbore fluid of claim 1, wherein the emulsion is stable up to 375° F.

4. The wellbore fluid of claim 1, wherein the alkyl cyclic anhydride is polyisobutylene succinic anhydride.

5. The wellbore fluid of claim 1, wherein the weight average molecular weight of R1 is in the range of 250 Da to 5 kDa.

6. The wellbore fluid of claim 1, wherein the polar reactant is one or more C1 to C10 alkyl amines.

7. The wellbore fluid of claim 1, wherein the emulsion has an oil:water ratio within the range of 40:60 to 95:5.

8. The wellbore fluid of claim 1, wherein the emulsifier is present at a concentration in the range of 1 ppm to 10,000 ppm.

9. The wellbore fluid of claim 1, wherein the emulsifier has the general formula of (I)-(III):

where n=5-20, R1 same or different from R2 and can be C1 to C18, R3 can be a monofunctional or difunctional acid, and R4 and R5 are independently selected from carboxylic acid, carboxylate, and an amide produced from a polyamine.

10. The wellbore fluid of claim 1, further comprising a weighting agent.

* * * * *